United States Patent
Rajagopal

(10) Patent No.: US 11,641,331 B2
(45) Date of Patent: May 2, 2023

(54) SYSTEM AND METHOD FOR BLOCKING DISTRIBUTION OF NON-ACCEPTABLE ATTACHMENTS

(71) Applicant: MICROSOFT TECHNOLOGY LICENSING, LLC, Redmond, WA (US)

(72) Inventor: Sukanya Rajagopal, Prague (CZ)

(73) Assignee: Microsoft Technology Licensing, LLC, Redmond, WA (US)

( * ) Notice: Subject to any disclaimer, the term of this patent is extended or adjusted under 35 U.S.C. 154(b) by 454 days.

(21) Appl. No.: 16/431,673

(22) Filed: Jun. 4, 2019

(65) Prior Publication Data
US 2020/0389421 A1 Dec. 10, 2020

(51) Int. Cl.
| | |
|---|---|
| *H04L 12/58* | (2006.01) |
| *G06F 16/13* | (2019.01) |
| *G06F 16/14* | (2019.01) |
| *H04L 9/06* | (2006.01) |
| *H04L 51/212* | (2022.01) |
| *H04L 51/046* | (2022.01) |
| *H04L 51/08* | (2022.01) |
| *H04L 51/52* | (2022.01) |

(52) U.S. Cl.
CPC ............ *H04L 51/212* (2022.05); *G06F 16/13* (2019.01); *G06F 16/152* (2019.01); *H04L 9/0643* (2013.01); *H04L 51/046* (2013.01); *H04L 51/08* (2013.01); *H04L 51/52* (2022.05)

(58) Field of Classification Search
CPC ............................. H04L 51/046; H04L 51/32
See application file for complete search history.

(56) References Cited

U.S. PATENT DOCUMENTS

| | | |
|---|---|---|
| 7,149,777 B1 | 12/2006 | Rhee |
| 7,281,269 B1 | 10/2007 | Sievers et al. |
| 7,343,624 B1 | 3/2008 | Rihn et al. |
| 7,698,558 B2 | 4/2010 | Tomkow |

(Continued)

FOREIGN PATENT DOCUMENTS

| | | |
|---|---|---|
| CN | 1643474 A | 7/2005 |
| CN | 104346582 A | 2/2015 |
| EP | 1425918 B1 | 11/2006 |

OTHER PUBLICATIONS

"US Non Provisional Application Filed under U.S. Appl. No. 15/926,860", filed Mar. 20, 2018, 51 Pages.

(Continued)

*Primary Examiner* — Nicholas R Taylor
*Assistant Examiner* — Sm Z Islam
(74) *Attorney, Agent, or Firm* — NovoTechIP International PLLC

(57) ABSTRACT

Systems and methods are described, and one method includes storing a database that includes a plurality of stored attachments, each of the stored attachments including a corresponding stored attachment identification data (ID), storing a blocked attachment indicator that indicates a stored attachment among the plurality of stored attachments as a blocked attachment and its corresponding stored attachment ID as a blocked attachment ID, and blocking a distribution of a file, based at least in part on the file including a metadata that matches at least a portion of the blocked attachment ID.

20 Claims, 9 Drawing Sheets

(56) References Cited

U.S. PATENT DOCUMENTS

| | | |
|---|---|---|
| 8,204,945 B2 | 6/2012 | Milliken et al. |
| 8,812,849 B1 | 8/2014 | Ubl |
| 9,104,687 B2 | 8/2015 | Euresti et al. |
| 9,614,796 B2 | 4/2017 | Aleksandrov |
| 9,961,049 B2 | 5/2018 | Lim et al. |
| 2004/0010543 A1 | 1/2004 | Grobman |
| 2004/0073617 A1* | 4/2004 | Milliken ............... G06F 21/562 709/206 |
| 2005/0283461 A1 | 12/2005 | Sell et al. |
| 2006/0168048 A1 | 7/2006 | Lyle et al. |
| 2006/0282888 A1* | 12/2006 | Bandini ................. G06F 16/22 726/14 |
| 2007/0016613 A1* | 1/2007 | Foresti ................. G06Q 10/107 |
| 2008/0052284 A1* | 2/2008 | Stokes ................... G06Q 10/06 |
| 2009/0005010 A1* | 1/2009 | Dote ....................... H04L 51/58 455/412.1 |
| 2009/0012141 A1* | 1/2009 | Ahn ....................... A61K 38/06 514/400 |
| 2009/0013141 A1* | 1/2009 | Kinoshita ............. G06F 21/554 711/E12.091 |
| 2012/0297463 A1* | 11/2012 | Orbach ................ G06Q 10/107 726/4 |
| 2015/0264111 A1* | 9/2015 | Aleksandrov .......... H04L 51/08 726/4 |
| 2016/0380938 A1 | 12/2016 | O'connor |
| 2018/0097758 A1* | 4/2018 | Benson .................. H04L 51/18 |

OTHER PUBLICATIONS

"WhatsApp Encryption Overview", In Technical Whitepaper of Whatsapp, Dec. 19, 2017, 12 Pages.

Chris, Smith, "WhatsApp Update Proves App is Storing Your Images Long After Deletion", Retrieved From https://www.trustedreviews.com/news/whatsapp-update-android-photo-video-stored-3454076, Apr. 16, 2018, 4 Pages.

Gupta, et al., "WhatsApp told India That Tracing Fake News Would Break Encryption. Is This True?", Retrieved From https://thewire.in/tech/whatsapp-india-tracing-fake-news-encryption, Aug. 25, 2018, 8 Pages.

"International Search Report and Written Opinion Issued in PCT Application No. PCT/US20/029425", dated Jul. 2, 2020, 12 Pages.

\* cited by examiner

SYSTEM AND METHOD FOR BLOCKING DISTRIBUTION OF NON-ACCEPTABLE ATTACHMENTS

BACKGROUND

In present messaging systems, an end user can send a message with an attachment, for example, to a social media group to which the end user belongs, whereupon the messaging system, upon receiving the attachment, may store the attachment in a system storage, and then distribute to the social media group a message that includes a link to the attachment. Members of the group can then download the attachment, e.g., by clicking on the link. For reasons such as a tendency by individuals to distribute items that appear interesting, the group members may then upload and re-distribute the downloaded attachment to other groups and individuals.

However, events relevant to acceptability of the attachment may have occurred after the attachment message has been received at the system server. Such events can relate, for example, to the attachment's social acceptability. One or more members of the initial recipient group, though, may not know of the change in status.

Current messaging systems may include resources that can, once such events are detected, apply measures for protecting the messaging server against receiving and providing clients the potentially unacceptable attachment. However, a technical problem with current messaging systems is that already downloaded copies of the attachment can still be distributed, e.g., by uploading to the system for attachment to outgoing messages, and for sending link-embedded messages to other clients of the server. Hence, there is a need for preventing distribution through messaging systems of attachments that have been determined unacceptable subsequent to download.

SUMMARY

This Summary is provided to introduce a selection of concepts in a simplified form, and these as well as others are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

An example of disclosed systems can include a processor and a memory coupled to the processor, the memory storing instructions that when executed by the processor can cause the processor to store, in a database, a plurality of stored attachments, each of the stored attachments including a corresponding stored attachment identification data (ID); store a blocked attachment indicator that can indicate a stored attachment among the plurality of stored attachments as a blocked attachment and its corresponding stored attachment ID as a blocked attachment ID; and to block a distribution of a file, based at least in part on the file including a metadata that matches at least a portion of the blocked attachment ID.

An example of disclosed methods can include storing a database that can include a plurality of stored attachments, each of the stored attachments including a corresponding stored attachment identification data (ID); storing a blocked attachment indicator that can indicate a stored attachment among the plurality of stored attachments as a blocked attachment and its corresponding stored attachment ID as a blocked attachment ID; and blocking a distribution of a file, based at least in part on the file including a metadata that matches at least a portion of the blocked attachment ID.

An example of disclosed non-transitory computer readable media can include stored instructions that, when executed, can cause a programmable device to receive store a database that can include a plurality of stored attachments, in which each of the stored attachments can include a corresponding stored attachment identification data (ID); and o store a blocked attachment indicator that can indicate a stored attachment among the plurality of stored attachments as a blocked attachment and its corresponding stored attachment ID as a blocked attachment ID; and to block a distribution of a file, based at least in part on the file including a metadata that matches at least a portion of the blocked attachment ID.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

Figure 1:
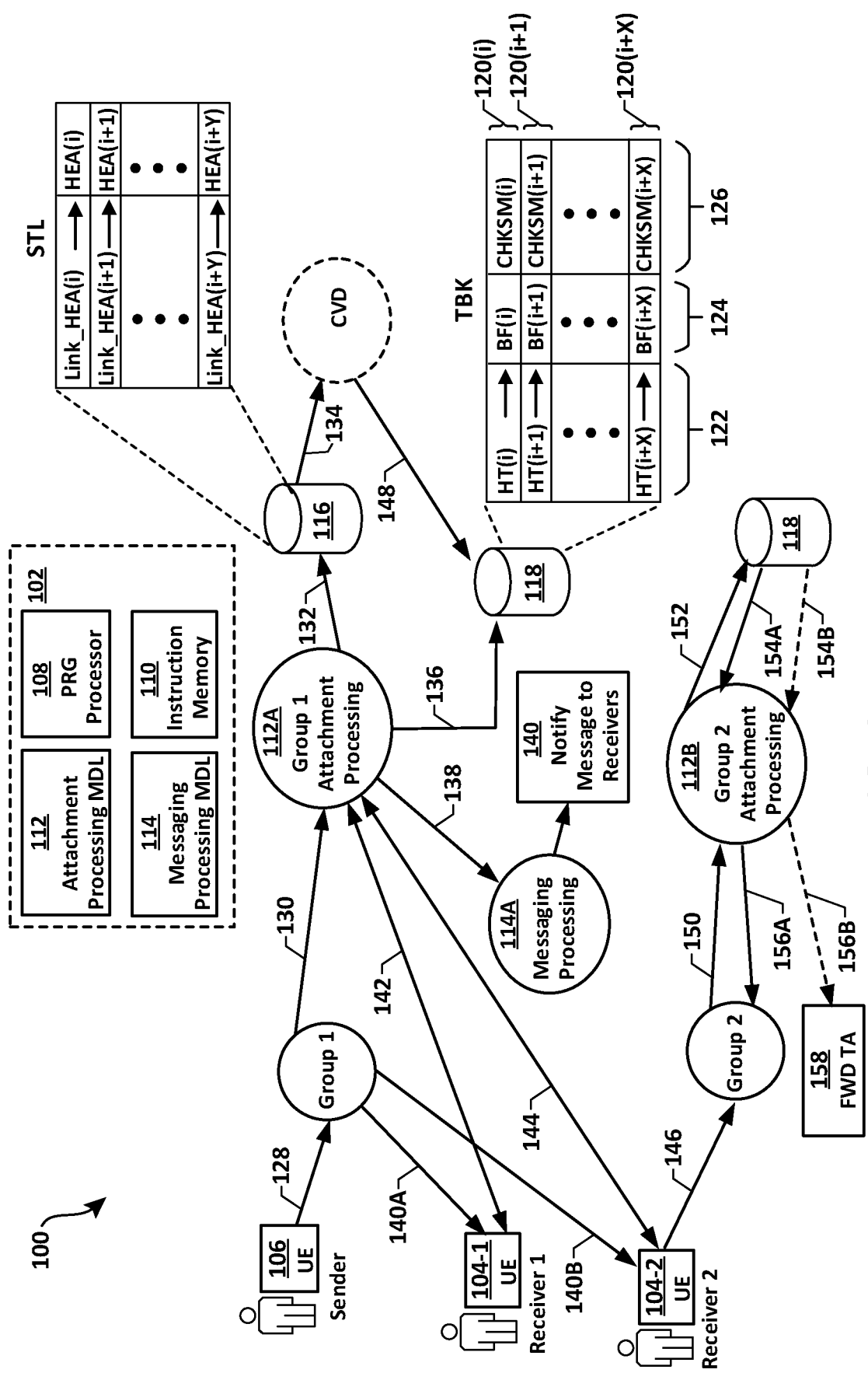
FIG. 1 shows a high level functional block diagram of one example system for preventing distribution of non-acceptable attachments, with a superposed diagram of example logic operations in one more processes of such prevention, in accordance with various aspects of the present disclosure.

In the following detailed description, numerous specific details are set forth by way of examples in order to provide a thorough understanding of the disclosed subject matter. It will be apparent to persons of ordinary skill, upon reading this description, that various aspects can be practiced without such details.

In operations within present messaging systems, an end user can forward an attachment, e.g., a Twitter™ attachment, to members of a social media group to which the end user belongs, and who the end user believes may not have previously received the attachment. In accordance with operation of current messaging systems, attachments can arrive at the messaging system server. Present messaging systems may strip off any personally identifiable information (PII) metadata and store the resulting PII-stripped attachment in a system storage. Such messaging systems can then generate a distribution message that includes a link to the attachment, with "link" being information sufficient for the system to retrieve the attachment from storage. The distribution message can then be sent to the members of the social media group. Each of the members can then download the attachment, e.g., by clicking on the link.

A number of the group members for various reasons may then distribute the downloaded attachment to other groups and individuals. However, the attachment may have become unacceptable in content, for any of various reasons, from when the distribution message was first received at the system server to when one or more members in the initial receiving group proceeds to distribute the downloaded attachment. Such events can relate, for example, to the attachment's social acceptability. In scenarios where the attachment may appear on its face as a news or actual live witness report, subsequent events can relate to the accuracy or validity of the attachment content. For example, the attachment may be deemed as a violation of someone's privacy, or after sending the attachment the sender may deem it as not appropriate. As another example, persons, or automatic detection systems, or both, may determine that the attachment falls under the category of fake news, or is a hatred spreading message. In real-world scenarios, some or all of the members of the initial recipient group may not know, as of the time such members distribute the attachment to other individuals or groups, of the above-described events relating to the attachment content.

Current messaging systems can include, or have access to, attachment monitoring resources, e.g., content validation resources, having capability of detecting events such as described above. Current messaging systems can also include resources that can, once such events are detected, apply measures for protecting the messaging server against later receipt of the subject attachment. However, such measures may not prevent users, to whom the original message having the subject attachment has been delivered, and who have downloaded the attachment, from distributing it.

Systems and methods according to this disclosure can prevent users from distributing an attachment after it has been deemed unacceptable. In one implementation, the messaging server can, upon receiving an externally sourced message addressed to server clients and having an attachment, generate or provide an identifier (ID) for the attachment, and include the ID in the attachment for storage. The server can store the ID inclusive attachment, as a stored attachment, in a database. The database can be configured as link-accessible. The server can send addressee clients a notification that includes the link. Recipient clients can download the stored attachment, for by clicking on the link. In an implementation, the server can maintain, for every such attachment received, an entry that includes a field for a blocking indicator or flag. The entry can be indexed and accessible using, for example, the ID from the embedded ID attachment. The server can also send the attachment to a content validity service, and can receive from the service notices of attachment non-acceptability. The server can, in response, store a blocking flag in the attachment's table entry. The server, in its processing of user attempts to distribute an attachment, or any file, can extract a metadata (if any) from the file and use the metadata to check the blocking flag memory for a blocking flag. If the metadata matches the ID of a stored attachment which has a corresponding blocking flag, the metadata retrieves the blocking flag, and the server prevents distribution of the attachment. The ID applied to or otherwise included in attachments the server receives can be a hash of the attachment, or can be an assigned identifier. The inclusion can be implemented, without limitation, as appended, prepended, inserted, or embedded.

Technical features include, without limitation, unimpeded distribution of client-originated attachments. Technical features also include, but are not limited to, no requirement for the messaging server to inspect attachment content. Additional technical features can include, without limitation, pre-upload qualification, enabling the server to check for blocking flags prior to client uploading of an attachment. This can provide a further technical benefit of reducing bandwidth cost associated with blocking of attachment distribution.

FIG. 1 is a high level functional block diagram of one system 100 for preventing distribution of non-acceptable attachments, with a superposed diagram of example logic exchanges in one more prevention processes, in accordance with various aspects of the present disclosure. An implementation of system 100 can include a server resource 102 and a plurality of user devices or "UEs," functionally coupled to the server resource 102 as clients, at least for certain messaging communications. FIG. 1 shows, as representative examples of such client UEs, a first UE 104-1 and a second UE 104-2 (collectively referred to as "client UEs 104"). The system 100 can be capable of receiving messages, such as short message service (SMS) or instant message (IM), from external UEs, such as the representative example external UE 106.

It will be understood that "server," as used in this disclosure, is a logic resource, and implementations in practices according to this disclosure are not limited to any particular technology, architecture, or geographical distribution of hardware. Logic blocks of the server resource 102 can include a programmable processor 108 (labeled "PRG Processor" 108 in FIG. 1) coupled to an instruction memory 110. The server resource 102, and its PRG processor 108 and instruction memory 110 can be provided, for example, by a cloud computing system (not explicitly visible in the figures), or can be provided by one or more server units, for example, available from various commercial vendors. The instruction memory 110 can be structured to store computer executable instructions (not separately visible in FIG. 1) that, when read and executed by the PRG processor 108, can cause the processor 108 to implement processes, operations, and other functionalities as described herein. The computer executable instructions can include instructions that can be logically grouped, for purposes of description, into blocks or modules having respective functionalities. For example, the computer executable instructions can include instructions logically grouped as an attachment processing module 112 (labeled "Attachment Processing MDL" 112 in FIG. 1) and as a messaging processing module 114 (labeled "Messaging Processing MDL" 114 in FIG. 1). It will be understood that "module," as used herein, does not impose or imply any limitation as to commonality of storage area, or to instructions being dedicated to a particular module. For example, a stored computer executable instruction or group of computer executable instructions can be a component of Attachment Processing MDL 112 and a component of Messaging Processing MDL 114.

The Attachment Processing MDL 112 functionalities can include, without limitation, removing attachments from externally sourced messages, such as from external sender UE 106, adding a unique attachment identification data to each, and storing the results as "stored attachments" in a storage 116, such as described in greater detail later. The storage 116 can be configured as a link-accessible storage and will therefore be referred to as "link-accessible attachment storage" 116. The link-accessible attachment storage 116 can be configured, for example, by attachment processing MDL 112, to store the attachments as a database. FIG. 1 shows an example of such a database as "STL," which will be referred to as "stored attachment database STL." The stored attachment database STL can hold stored attachments in a logic row-entry form, such as the examples visible in FIG. 1 as STC(i), STC(i+1), . . . , STC(i+Y), "i" being an integer index and integer "Y" being an arbitrary depth. The stored attachments STC(i), STC(i+1), . . . , STC(i+Y) (herein referred to collectively as "STC" and singly as "STC(i)"), can include a link field such as "LF(i)," an attachment content field such as "ATC(i)," and a stored attachment identification data, such as STC-ID(i).

The system can include a memory resource 118 for storing "blocking flags" or equivalent indicators of particular stored attachments STC being blocked from distribution. The memory resource 118 can be logically configured as a row-entry memory, such as the example TBK. The row-entry memory can include an entry 120(*i*) for each instantiation of an STC in the database STL. Each entry 120(*i*) can be indexed by the STC-ID(i) content of an STC-ID field 122, with STC-ID(i) being the identifier of the STC(i) to which the entry corresponds. Each entry 120(*i*) can include a blocking indicator or flag field 124, which can be configured to hold, for example, a blocking flag BF(i). In an implementation, BF(i) can be defined such that presence of BF(i) can indicate the STC(i) is blocked from being distributed, and absence of BF(i) can indicate the STC(i) is not blocked. BF(i) can be defined as a two-state flag having a blocking state and an "approved" or not-blocked state. In an aspect, each entry 120(*i*) can include checksum field 126. As described later a system 100 resource, e.g., the attachment processing module 112, can be configured to calculate a CHKSM(i) for each STC(i) and insert CHKSM(i) in the checksum field 126 of the STC(i) entry 120(*i*). Example operations that can be performed on or supported by the system 100, in various processes in accordance with this disclosure, are represented by overlaid directed arrow and number annotations, e.g., numerals 128 through 156, described in greater detail later in this disclosure.

Figure 2:
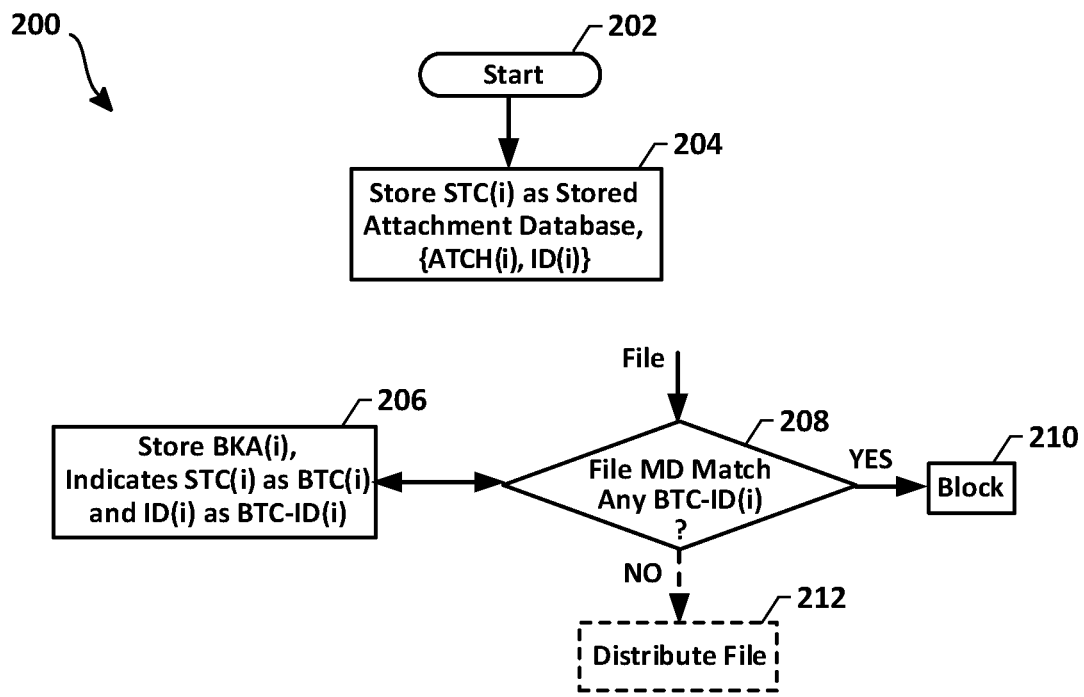
FIG. 2 shows a logic flow diagram of example operations in one or more processes in preventing distribution of non-acceptable attachments in accordance with various aspects of the present disclosure.

FIG. 2 is a logic flow diagram 200 (hereinafter "flow 200") of example operations in one or more processes in preventing user distribution or communication of unacceptable files, in accordance with various aspects of the present disclosure. For convenience, example instances of operations in the flow 200 will be described in reference to the FIG. 1 system 100. In one instance, operations of the flow 200 can proceed from an arbitrary start 202 to 204, where operations can be applied to receive, for example at a server such as the FIG. 1 server 102, a plurality of attachments, (herein referred to collectively as "ATC" and singly as "ATC(i)"), and to store as these as stored attachments, such as the above-described stored attachments STC. The stored attachments STC can be stored in a database DB, such as the FIG. 1 stored attachment database STL. The attachments ATC can be, but are not necessarily, attachments to externally sourced messages, e.g., from external UE 106. The stored attachments STC can be entries (not separately visible in FIG. 2) in DB, each including a content of attachment ATC(i) and a stored attachment identification data STC-ID (i). The STC-ID(i) can be attachment-unique. It will be understood that "unique," as used herein in the context of identifying attachments and other files, can encompass strictly unique, where collisions are categorically impossible, and can encompass an acceptable collision rate. Persons of ordinary skill in the pertinent arts will understand that boundaries of "acceptable" can be application-specific and such persons, having possession of this disclosure and facing a particular application, can readily determine applicable boundaries of "acceptable," and can readily select an appropriate identification scheme, e.g., hash algorithm.

The STC(i) entries can be stored as link-accessible in the database DB. The link can be configured, for example, for inclusion in notice messages (not separately visible in FIG. 2) for sending to one or more clients of the server, such as the FIG. 1 UEs 104, e.g., for client download of STC. It will be understood that "ATCH(i)" carried in the STC entries in DB is not necessarily bit-wise identical to ATCH(i), e.g., can be an encoding of ATCH(i).

In operations that can be independent from and asynchronous to the storing of STC at 204, the flow 200 can include, at 206, storage of one or more blocked attachment indicators, BKA(i), each indicating an $i^{th}$ stored attachment STC(i) among the plurality of stored attachments STC as a blocked attachment, BTC(i), and STC-ID(i) as a blocked attachment ID, BTC-ID(i). Implementations can feature receiving BKAs from an external attachment verification service, such as the FIG. 1 CVD, to which stored attachments can be provided for scanning or monitoring to detect non-acceptable content. As also described in greater detail later in this disclosure, implementations can feature, for example by configuration of the server 102, scanning of the database DB to detect stored attachments STC that have, or can be estimated as likely having content that matches one or more descriptors of non-acceptable content. Schedules for such scanning of the database can include periodic, random, event-driven, or commanded, or any combination or sub-combination thereof.

In operations that can be independent from, and can be asynchronous to both the storing of STC at 204 and the storing of one or BKAs at 206, or both, the flow 200 can include, at 208, blocking a distribution of a file based, at least in part, on the file including a metadata that matches any BTC-ID(i). As described in greater detail later, blocking at 208 can include blocking an upload of a file from a client, e.g., from any client UE 104, to a server, e.g., to server 102 for potential distribution to other clients 104, or to destinations external to the system. In addition, as described in greater detail later, detection of "matches" at 208 can include detection of metadata being within a certain distance or certain range of similarity to any BTC-ID(i).

In an aspect, blocking at 208 can include receive a request from a sender, such Receiver 1 or Receiver 2, to distribute a file as an attachment to an email, IM, or SMS and, associated with receiving the request to distribute the file, to determine whether the file includes metadata that matches at least the portion of the blocked attachment ID. In addition, blocking the distribution of the file can include causing a display of a device associated with the sender, e.g., 104-1 or 104-2, to display an indication of the attachment being blocked.

Figure 3:
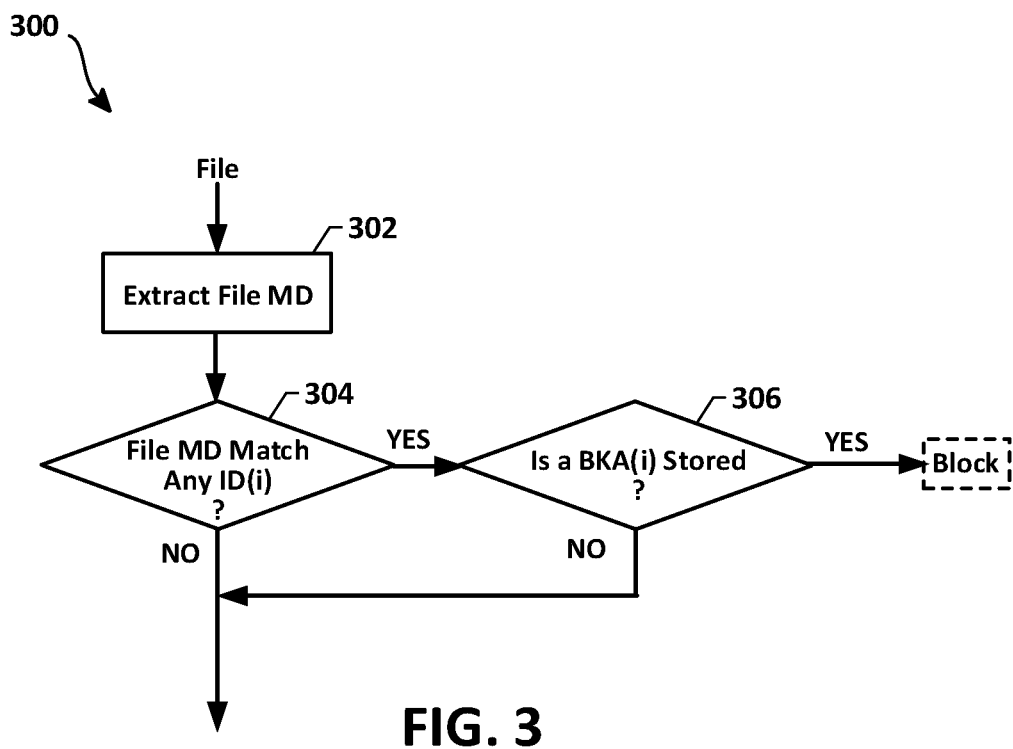
FIG. 3 shows a logic flow diagram of operations in one example implementation of FIG. 2 logic block providing determination of matches between file metadata and blocked attachment identifiers, in one or more processes in preventing distribution of non-acceptable attachments in accordance with various aspects of the present disclosure

FIG. 3 shows a logic flow diagram 300 of operations (hereinafter "flow 300") in an example process implementing the FIG. 2 block 208. Flow 300 operations can include, at 302, receiving a file such as input to block 208, extracting the file's metadata (labeled "MD" in FIG. 3), then proceeding to 304 and applying operations, e.g., checking the database DB, to determine if MD matches any stored attachment ID, i.e., STC-ID(i). If the determination at 304 is "YES," the flow 300 can proceed to 306 and determine if there is a blocked attachment indicator, e.g., BKA(i) corresponding to the matching STC (i). In other words, operations at 306 can determine whether the matching STC(i) is a blocked attachment BTC. If the determination at 306 is "YES," the flow 300 can proceed to FIG. 2 210 and block the distribution.

Figure 4:
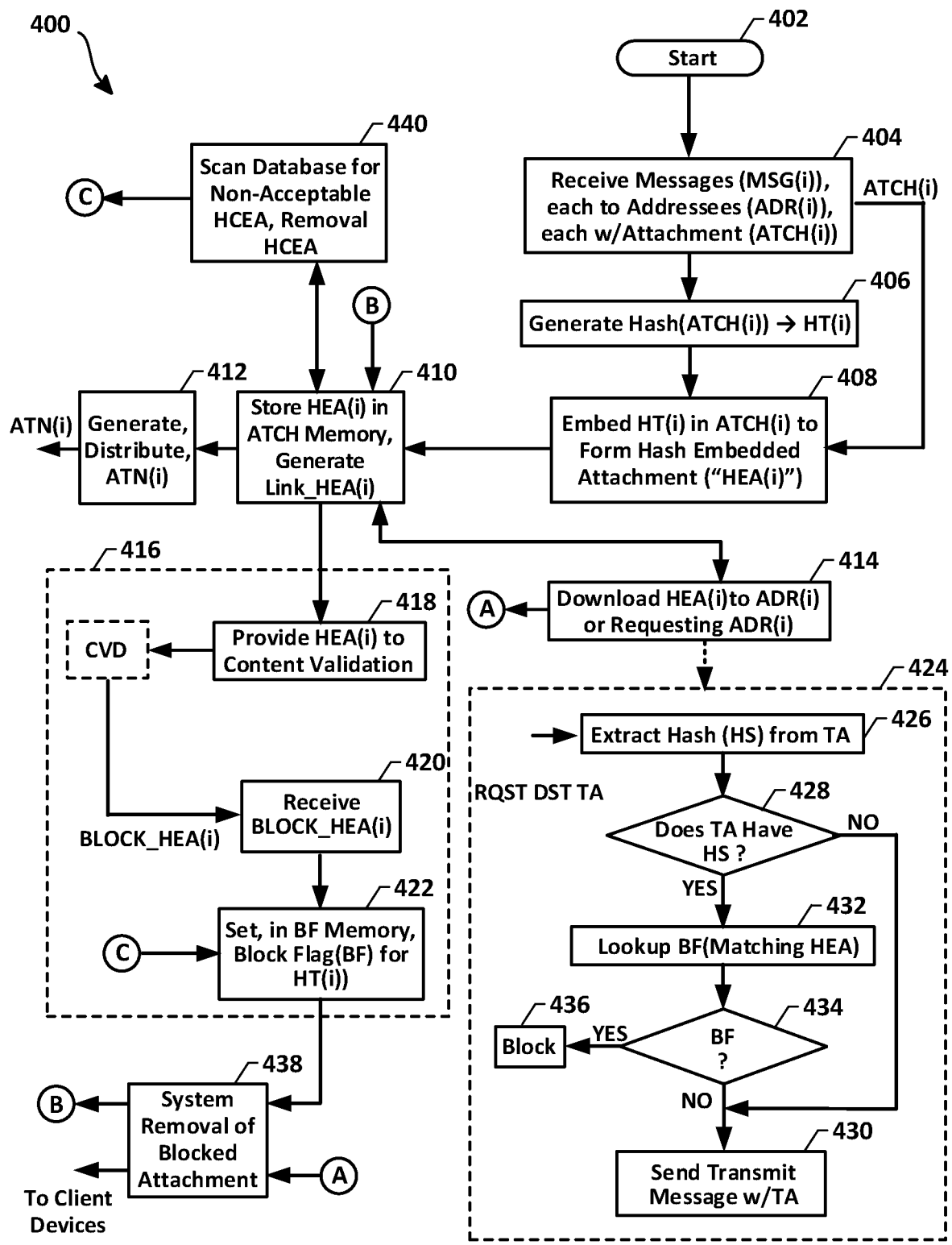
FIG. 4 shows a logic flow diagram of example operations in an implementation of one or more processes in preventing distribution of non-acceptable attachments, in accordance with various aspects of the present disclosure.

FIG. 4 shows a logic flow diagram 400 (hereinafter "flow 400") of example operations in an implementation of one or more processes in preventing distribution of non-acceptable attachments, in accordance with various aspects of the present disclosure. The flow 400 is described in reference to a system first receiving attachment files as attachments to externally sourced instant messages. Persons of ordinary skill in the pertinent art, though, upon reading this disclosure, can readily adapt the flow 400 to control of distribution of attachments received by means other than externally sources instant messages.

Operations in the flow 400 can proceed from an arbitrary start 402 to 404, where Messages (i) (herein also referred to as "MSG(i)") can be received. MSG(i) can be from an external entity, such as UW 106, and can be randomly spaced. Each MSG(i) may include an Attachment(i) (herein also referred to as "ATCH(i)") and can carry addresses (herein also referred to as "ADR(i)") of one or more intended destination end users. Associated with each reception at 404, the flow 400 can proceed to 406, where operations add to ATCH(i) a unique, or acceptably unique identifier (ID). For purposes of description, hash will be referenced as one example ID technique. It will be understood that hash is only an example and is not intended to limit the scope of practices according to this disclosure. On the contrary, all recitations of "hash" or abbreviations for same will be understood to mean "hash or other identifier."

Hash algorithms, if used, can be selected from among known conventional hash algorithms, such as Secure Hash Algorithm 1 ("SHA-1"), SHA256, MD2, MD4, ND MD5. Such algorithms are known and readily available from various vendors, e.g., Microsoft Corporation, and therefore further detailed description is omitted. It will be understood that these are only examples, and are not intended as limitations, or preferences for practices according to this disclosure.

Upon generation of Hash(ATCH(i)) at 406, the flow 400 can proceed to 408, and add Hash(ATCH(i) ID to the attachment ATCH(i). For purposes of description, the addition can be termed "embedding," and the result can be termed a "hash embedded attachment," which will be referenced as "HEA(i)." Techniques applied at 408 for embedding Hash(ATCH(i)) can be in accordance with general hash embedding techniques not necessarily specific to practices according to this disclosure. Therefore, further detailed description of embedding operations at 408 is omitted. It will be understood that, except where explicitly stated otherwise, or made clear from surrounding context to have a different meaning, that "embed" and "embedded" can encompass the ordinary and customary meaning of the term, as well as combination techniques such as, but not limited to, appending, prepending, and inserting.

In one optional implementation, operations in the flow 400 can receive attachments already including a unique identifier and, therefore, blocks 404, 406, and 408 can be omitted and operations can start at 410.

In an implementation, operations at 404 and 406 can be provided with capability of overlap, e.g., operations at 404 can be receiving a given MSG(i) concurrently with operations at 406 generating HT(i) for an earlier received message, e.g., MSG(i-1).

Upon generation of HEA(i) at 408, the flow 400 can proceed to 410 where HEA(i) can be stored in a database DB, for example, the FIG. 1 database STL supported by the attachment storage 116. The attachment storage 116 can be implemented as a link-accessible storage device. Accordingly, operations at 410 can include generation of a link, which will be referenced as "Link_HEA(i)," by which HEA(i) can be retrievable, e.g., from the system 100 attachment storage 116. Generation and configuration of the Link_HEA(i), and specific implementation of the storage 116 being link-accessible can be in accordance with conventional linked storage techniques, not necessarily specific to practices according to this disclosure. Therefore, further detailed description of such implementation and configuration thereof is omitted.

Upon storage of HEA(i) and generation of the Link_HEA (i) at 410, the flow 400 can proceed to 412, where operations can distribute a notification message to the addressees of the original message received at 404, which can include the above-described Link_HEA(i), by which HEA(i) can be retrieved, e.g., from the attachment storage 116. The attachment notification message will be referred to herein as "ATN(i)."

Upon distributing ATN, the flow 400 can proceed to 414 and respond to HEA(i) download requests from the ATN(i) recipients. Since ATN(i) includes the Link_HEA(i), download requests can be generated, for example, by recipients' user devices, e.g., FIG. 1 UEs 104-1 and 104-2, in response to the clicking on the ATN(i) Link_HEA(i). Operations at 414 in response can include the server, e.g., FIG. 1 server 102, using the Link_HEA(i) to retrieve HEA(i) from storage (e.g., the STL database in FIG. 1 storage 116) and then download a copy of HEA(i) to the requestor.

Referring to FIG. 4, in a timing that can be asynchronous to, and independent from above-described operations at 412 and 414, the flow 400 can proceed with attachment validation and monitoring operations at 416. Such operations can include, for example, at 418, the attachment processing module 112 providing HEA(i) to the content validation service CVD. Alternatively, the attachment storage 116 can be configured such that HEA content is accessible by the CVD entity. The CVD can then proceed to apply various inspection and monitoring processes and algorithms (not explicitly visible in FIG. 1). The CVD can also, upon detection of non-acceptable attachments, can send the system 100 a notice of non-acceptable attachment, such as the example BLOCK_HEA(i) visible in FIG. 4. As depicted by conditional flow block 420, when a BLOCK_HEA(i) notice is received, operations at 422 can be applied to set, for example, in the blocking flag memory 118, a blocking flag BF corresponding to the particular attachment determined unacceptable by CVD, i.e., HEA(i). With respect to setting the blocking flag BF, the BLOCK_HEA(i) can include an identifier of the particular attachment HEA(i), whereupon HEA(i) can be retrieved, for example, from the attachment storage 116. Since the example logic Table TBK is hash-indexed, the memory 118 entry 120(i) corresponding to HEA(i) can then be accessed, for example, using the HT(i) hash of HEA(i). A content of the blocking flag field 124(i) of that entry 120(i), which can be referred to as "BF(HT(i))," can then be set to BF by the operations 422. Criteria and algorithms applied at CVD can be fixed, or can be variable, or both, which can include user-specific fixed or can be variable.

Referring again to FIG. 4, after block 414 has downloaded at least some copies of HEA(i), a user, for example, Receiver 1 or Receiver 2 may attempt to distribute a file. Operations of such distribution can include, for example, the server, e.g., 102, receiving an upload of an attachment along with a "send" message. Operations in the flow 400 can respond by determining whether the file is a copy of a downloaded HEA(i) and, if so, determining whether a blocking flag BF(i) is stored for that HEA(i).

Specific example operations in processing the distribution attempt can include the server 102 receiving, for example, from Receiver 1 or Receiver 2, a request to distribute a file TA. FIG. 4 shows one example labeled "RQST_DST_TA." The actual attachment TA may be received, with RQST_D-ST_TA, e.g., as an upload. Alternatively, the attachment TA may remain at the client, and not be uploaded to the server until distribution is granted, as described in greater detail later.

As described above, TA may be a copy of an attachment HEA(i), i.e., a received attachment ATCH(i) to which HT(i) metadata. Also, at some time prior to RQST_DST_TA, TA may have been determined non-acceptable and its distribution blocked, e.g., by inserting a BF(i) in the memory 118. Accordingly, the flow 400, in response to receiving RQST_DST_TA, can proceed to 424 to determine whether TA is a blocked attachment, select accordingly between performing and blocking of the distribution, and then apply operations in accordance with the selection. Example operations at 424 will be described assuming TA is a hash-embedded attachments HEA such as described in reference to block 408. Operations at 424 can therefore include, at 426, applying hash extraction to TA. The hash, if extracted, will be referred to as "HS." The specific hash extraction at 426 can be selected, for example, from among known, conventional hash extraction algorithms. Upon operations at 426 determining that TA has no hash or no hash according to the particular hash applied at 406, the flow 400 can proceed to 430, as depicted by the "NO" outbranch of flow path block 428, where operations can distribute TA in accordance with RQST_DST_TA. In contrast, upon operations at 426 extracting a recognizable hash HS the flow 400 can proceed to 432, as shown by the "YES" outroute from flow path block 428. At 432, operations can determine whether the blocking flag memory 118 stores a corresponding blocking flag BF. Operations at 432, in other words, can determine whether HS matches one of the HT(i) for which the blocking flag memory 118 stored a corresponding blocking flag BF. Upon a negative result of the determination at 432, the flow 400, as represented by the "NO" outbranch from conditional flow path 434, can proceed to 430 where operations can be applied to distribute TA in accordance with RQST_DST_TA.

Upon a positive result of the determination at 432, the flow 400, as represented by the "YES" outbranch from conditional flow path 434, can proceed to 436, where blocking operations can be applied. Operations at 436 can include the messaging server sending (not explicitly visible in FIG. 4), for example, to the requestor who sent RQST_D-ST_TA, a notice of the distribution being blocked. Additional features can include sending (not visible in FIG. 4), to a system Internet Technology (IT) administrator, a notification of the distribution having been blocked.

Referring to FIGS. 1 and 4, instances of the above-described operations in the flow 400 will be described in reference to annotations on FIG. 1. At 128, a sender can transmit, e.g., from a UE 106, a message with Receiver 1 and Receiver 2 among its addressees, and including an attachment, such as one of above described attachments ATCH(i). The Receiver 1 and Receiver 2 can be considered "Group 1" clients. In response, the attachment processing module 112 can, at 130, apply a unique identifier, such as the above-described STC-ID(i), to the ATCH(i) and can generate a hash-embedded attachment, such as the above described HEA(i). The attachment processing module 112 can, at 132, store the hash-embedded attachment, for example, in the database STL of the attachment storage 118. The attachment processing module 112, in an implementation, can provide at 134 the hash-embedded attachment to the CVD and can create entry in the blocking flag memory 118. The entry can be indexed by the hash (or other identifier) applied at 130. Also associated with operations at 130, the attachment processing module 112 can, at 138, send to the messaging processing module 114 a link, e.g., the URL, to the stored attachment, e.g., HEA(i)) stored in 116 at 132. The messaging processing module 114 can then at 140, send as 140A and 140E3 respective notification messages to Receiver 1 and Receiver 2, i.e., the addressees of the message 128.

Upon receiving the notification message 140A, Receiver 1 can, at 142 and request download of the attachment whereupon the attachment processing module 112 can respond with that download. Receiver 2, at 144, can similarly request and receive the download. It will be understood that the downloads 142 and 144 can be in the order that Receiver 1 and Receiver 2 request same, which is not necessarily in the order described above.

At 146 Receiver 2 can initiate distribution of the attachment, to a destination outside of the original recipients. The initiation can include, at 146, uploading the attachment to the server 102. Before describing operations by the server, e.g., the attachment processing module 112 responding to the uploading at 146, it will be assumed for this example that, at 148, the CVD sends the blocking flag memory 118 a notice of detecting the attachment to the message at 128 as having non-acceptable content. The memory 118 can respond, for example, by loading or setting a blocking flag in the entry 120 that was created for the attachment.

Referring to FIG. 1 in response to the uploading at 146 of the attachment, the attachment processing module 112 can, at 150, extract the embedded metadata from the uploaded attachment server 103 and then at 152 can check the blocking flag memory 118 to see if the extracted metadata matches an entry in which a blocking flag has been stored. As described above, for this example it is assumed that a blocking flag has been stored. Accordingly, operations in response to 152 can include blocking the distribution, followed by sending at 154A a notice of reasons for the blocking, followed by deliver at 156A of the notice to the requestor, i.e., Receiver 2.

Assuming that the above-described receipt at 148 and setting of a blocking flag had not occurred, operations in response to the checking at 152 can include authorizing the distribution at 154B, followed performing the distribution at 156B.

Referring to FIG. 4, an implementation, e.g., of the Group 2 attachment processing 112B of attachment processing module 112 can provide an automatic system-wide purge, or an optional system-wide purge or any combination thereof, of attachments deemed unacceptable. For example, in association with setting a blocking flag at 422, the flow 400 can proceed to 438. In an implementation, features of 438 can include receiving, by connection of the reference points "A," a history or other report of all downloads of attachments. Based on such information, upon receipt of a blocking flag notice from CVD, the system can issue erasure of all downloaded instances of the subject attachment. In addition, operations at 438 can include, as depicted by the connection of references "B," erasure of the subject attachment from the attachment storage 116.

As described, technical features of systems in accordance with system 400 include inserting hash metadata into received attachments, asynchronous with scanning of the attachments, e.g., by a content validation service CVD, and when unacceptable content is found, storing a blocking flag. Attempts to subsequently distribute the subject attachment can then be conditional on checking, e.g., in the table TBK, for a blocking flag. In an implementation, as shown by FIG. 4 block 440, operations by the CVD, or by the attachment processing module 112 or another module supported by the server 102, can scan the attachment database STL for stored attachments having on-acceptable content. Detection by the scan can, as shown by connection points "C," be input to block 422 to set a blocking flag BF. The scans at 440 can be periodic, or can be event-driven, e.g., based on new information, e.g., updated news reports. The scans can be manually instructed. The scans at 440 can be any combination of periodic, event-driven, and manually scheduled. In an implementation, the blocking flags BF can be supplemented to selectively indicate revocation of user access to particular to particular attachments in the database STC. Configuration can include setting such revocation indications, for example, in response to user-input commands, or administrator-input commands.

In an implementation, not explicitly visible in FIG. 4, metadata inserted in the HEA can include DRM (Digital Rights Management) data. Logic block 424 can be augmented or modified to also block distribution based on such DRM data.

Figure 5:
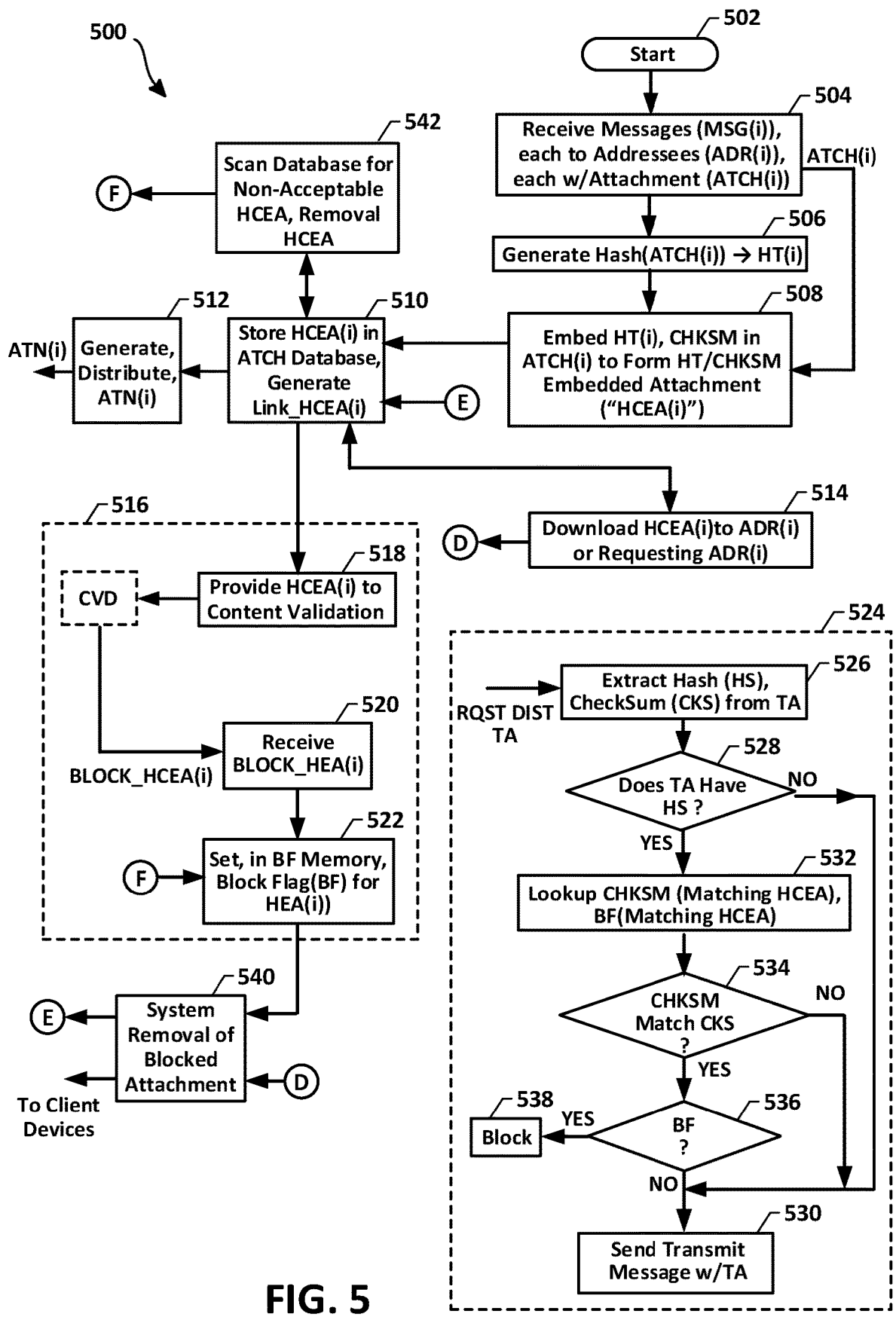
FIG. 5 shows a logic flow diagram of example operations in an implementation of one or more additionally or alternatively featured processes in preventing distribution of non-acceptable attachments, providing certain checksum based qualification and bypass, in accordance with various aspects of the present disclosure.

FIG. 5 is a logic flow diagram 500 of example operations that can be applied, in processes in accordance with various aspects of the present disclosure that can include certain checksum based qualification and bypass features.

Operations according to the logic flow diagram 500 (hereinafter "the flow 500") can begin at an arbitrary start 502 and proceed to 504, where operations can receive externally sourced messages, such as MSG. The messages MSG can arrive, for example, within a random interval sequence of MSG(i), each including destination addresses ADR(i), and each including an attachment ATCH(i). Associated with each reception at 504, the flow can proceed to 506, where hash operations can be applied to ATCH(i) to generate the above-described unique hash, HT(i). Upon generating HT(i) at 506, the flow 500 can proceed to 508, where operations can embed HT(i) and a checksum into the attachment ATCH(i) to form a hash/checksum embedded attachment, which will be referenced for purposes of description as "HCEA(i)." As described above for operations 404, 406, and 408, operations at 504, 506, and 508 can have overlaps. For example, operations at 504 of receiving a given MSG(r) can be concurrent with operations at 506 generating hash HT(r-1)) for the attachment ATCH(r-1) of an earlier received message, e.g., MSG(r-1). This can be performed concurrently with operations at 508 embedding HT(r-2) and Checksum into the attachment, e.g., ATCH(r-2) of an earlier received message, e.g., MSG(r-2).

Upon generation of HCEA(i) at 508, the flow 500 can proceed to 510 where HCEA(i) can be stored in a system memory, for example the system 100 HEA storage 116. As described above for storage operations 410 in flow 400, storage at 510 can include generation of a link, referenced here as "Link_HCEA(i)," by which HCEA(i) can be retrieved, e.g., from HEA storage 116. Upon storage of HCEA(i) with associated Link_HCEA(i) at 510, the flow 500 can proceed to 512, to generate an attachment notification message for distribution to the addressees of the message received at 504. An example notification massage can be the above-described ATN(i), having Link_HCEA(i). An example distribution can be to a distribution to all addresses ADR(i) of the originally received message MSG (i).

Upon distributing ATN(i) at 512, the flow 500 can proceed to 514, e.g., in response to receiving download requests from users who received ATN(i), to download copies of HCEA(i). In an example implementation, operations at 514 can be generally according to operations described in reference to 414 in the above-described flow 400 but substituting HCEA (i) for HEA(i).

Referring to FIG. 5 upon the storage of HCEA(i) and corresponding generation of the Link_HCEA(i) at 510, the flow 500 can also proceed to 516, and to monitor or scan HCEA(i) for conformance to system criteria, e.g., social acceptability, and indicia of being "fake news." As described above in reference to logic 416, operations at 516 can include operations at 518 of providing HCEA(i) to CVD; operations at 520 of receiving blocking notification, e.g., from CVD of HCEA(i) being a non-acceptable attachment, and corresponding storage at 522 of a blocking flag BF, for example in the FIG. 1 database 116.

After the first downloading at 514 of copies of HCEA(i), a request to distribute a copy of HCEA(i) may be received, from one of the users who requested a download. The flow 500, in response, can proceed to 524 and apply operations to select between performing the distribution and blocking the distribution, and then applying operations in accordance with the selection. Operations at 524 can include receiving RQST_DST_TA, e.g., from one of the FIG. 1 client UEs, 104-1, 104-2. The RQST_DST_TA can be received with an upload of TA from the requestor. Alternatively, as described in greater detail later, the RQST_DST_TA can be received prior to upload of TA. Assuming for this example, that the upload of TA is received, the flow 500 can, in response, proceed to apply at 526 hash extraction and checksum calculation operations. The hash extraction can be in accordance with hash extraction described in reference to FIG. 4 block 426. The result of the hash extraction is visible in FIG. 5 as "HS" and the result of the checksum calculation is visible as CheckSum or "CKS."

If operations at 526 determine TA has no hash then, as shown by the NO outbranch from conditional flow block 528, the flow 500 can proceed to 530 and distribute TA in accordance with RQST_DST_TA. If operations 526 extract a hash HS from TA, the flow 500 can proceed to 532, as shown by the "YES" outbranch of conditional flow block 528 and determine if the blocking flag memory 118 stores a corresponding blocking flag. Such operation can include, for example, checking 116 for a stored HCEA(i) having an ID that matches the metadata HS and then determining if the memory 118 stores a blocking flag BF for the matching HCEA. Since memory 118 can index blocking flags BF by the identifier of the stored attachment, e.g., by the hash HT(i), operations at 528 can check the memory 118 using HS, for an entry 120(i). If an entry is found the floe 500 can proceed to 532 and can check the entry's BF field as well as retrieve the CHKSM from the checksum field. The flow 500 can then proceed to 534 and compare the retrieved CHKSM to the calculated checksum CKS. A negative result of the comparing at 534 can indicate the content of attachment TA has been changed relative to the original. Implementations of the flow 500 can be configured such that this indicated change of TA content can release the attachment TA from being blocked, even if a blocking flag is stored in the memory 118. This is shown by the "NO" outbranch from conditional flow block 534, and it can carry the flow to 530, where operations can be applied to distribute TA in accordance with RQST_DST_TA.

Upon a positive result of the comparing at 534, flow 500 can proceed to 536 and determine if the blocking flag memory 118 stores a corresponding blocking flag BF. As shown by the "NO" outbranch of conditional flow block 536, associated with determination at 534 that the blocking flag memory 118 does not store a blocking flag BF, the flow 500 can proceed to 530 and distribute TA in accordance with RQST_DST_TA. In contrast, as shown by the "YES" outbranch of conditional flow block 536, if operations at 534 determine the blocking flag memory 118 stores a blocking flag BF corresponding to the extracted HS, the flow 500 can proceed to 538 where blocking operations can be applied. Operations at 538 can include sending (not explicitly visible in FIG. 5), for example, to the requestor who sent RQST_DST_TA, a notice of the distribution being blocked.

Referring to FIG. 5, and as described above in reference to FIG. 4 block 438, the flow 500 can include operations at 540, with connections "D" and "E," that, upon receipt of a blocking flag notice from CVD, can provide erasure of all downloaded instances of the subject attachment and erasure of the subject attachment from the attachment storage 116.

In an implementation, as shown by FIG. 5 block 542, and as described in reference to FIG. 4 block 440, operations by the CVD, or by the attachment processing module 112 or another module supported by the server 102, can scan the attachment database STL for stored attachments having on-acceptable content. Detection by the scan can, as shown by connection points "F," be input to block 522 to set a blocking flag BF. The scans at 542 can be periodic, or can be event-driven, e.g., based on new information, e.g., updated news reports. The scans can be manually instructed. The scans can be any combination of periodic, event-driven, and manually scheduled.

Figure 6:
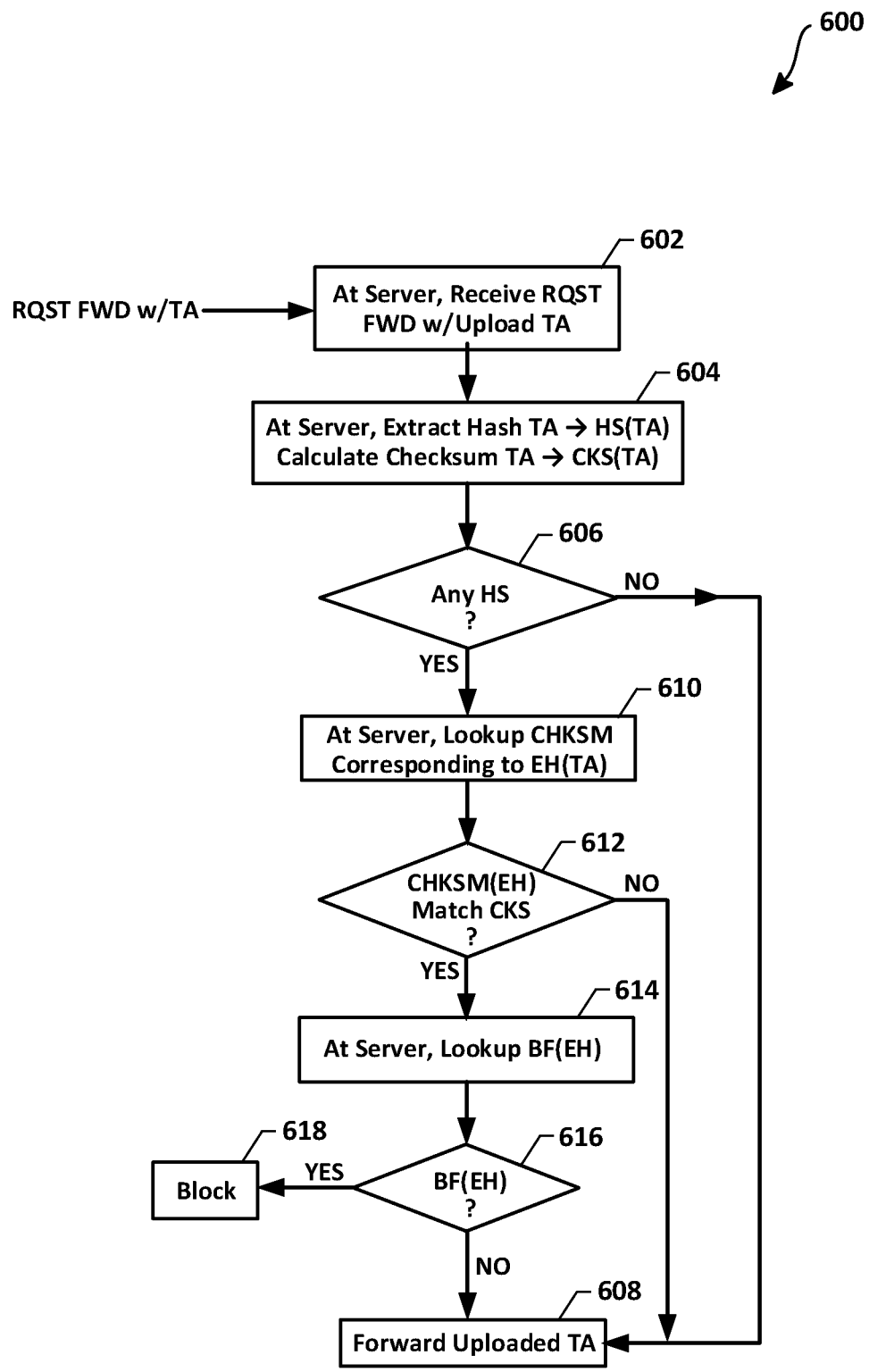
FIG. 6 shows a logic flow diagram of example operations in one or more processes of preventing distribution of uploaded non-acceptable attachments in accordance with various aspects of the present disclosure.

FIG. 6 shows a logic flow diagram 600 of example operations (hereinafter "flow 600") in one server-side implementation of operations at 524 of the FIG. 5 flow 500. Operations according to the flow 600 can include receiving at a messaging system server, for example the system 100 server 102, a client upload of an attachment TA with a distribution request, such as the example "RAST DST w/TA." In response, the flow 600 can proceed to 604 and extract from the uploaded TA a hash, if any, and calculate the checksum of TA. In the FIG. 6 example, the result of the hash extraction is visible as "HS(TA)," and the result of the checksum calculation is visible as "CKS(TA)." Upon a negative result at 604, e.g., the hash extraction not indicating a hash in accordance with that applied at 508 of the FIG. 5 flow 500, the flow 600 can proceed to 608, as shown by the "NO" outbranch of conditional flow block 606 and distribute uploaded TA in accordance with the RAST DST w/TA.

Continuing with example operations in the flow 600, upon operations at 604 extracting a valid HS(TA), the flow 600 can proceed to 610, as shown by the "YES" outbranch from the conditional flow block 606. Operations applied at 610 can include server-side retrieval, for example from the system 100 blocking flag memory 118, of a checksum corresponding to the extracted HS(TA). For example, assuming TA is a copy of a hash/checksum embedded attachment HCEA(j), "j" being an arbitrary integer index "i," that was previously downloaded by operations at 516 of the FIG. 5 flow 500, operations at 610 can retrieve the CHKSM(j) value that was embedded at 508, and stored (e.g., in the checksum field 126 of the system 100 blocking flag memory 118) in manner retrievable by the embedded hash HT(j).

Upon retrieving at 610 the CHKSM(j) value from the blocking flag memory 118 entry corresponding to the HS(TA) extracted at 604, the flow 600 can proceed to 612 and compare the retrieved CHKSM value to the CKS(TA) checksum calculated at 604. Based on the comparison at 612 indicating no match, the uploaded TA may be classified as an edited or otherwise modified form of a previously downloaded copy of a hash/checksum embedded attachment HCEA and, being edited or modified, TA may be not be subject to being blocked, even if the blocking flag memory 118 stores a blocking flag. Accordingly, as shown by the "NO" outbranch of the conditional flow block 612, the flow 600 can proceed to 608, where operations can distribute the uploaded TA in accordance with the RAST DST.

As depicted by the "YES" outbranch of the conditional flow block 612, if the retrieved CHKSM value matches the CKS(TA) checksum calculated at 604, the flow 600 can proceed to 614, and apply operations, e.g., inspection of the blocking flag memory 118, to determine if a blocking flag, e.g., BF(HS), corresponding to the extracted hash HS(TA) has been stored. As shown by the "NO" outbranch of conditional flow block 616, upon operations at 614 not finding a BF(HS), the flow 600 can proceed to 608 and distribute the uploaded TA in accordance with the RAST DST. In contrast, as depicted by the "YES" outbranch of conditional flow block 616, upon operations 614 finding an extant blocking flag BF(HS) in the blocking flag memory 118, the flow 600 can proceed to 618, where operations can be applied to block distribution of the uploaded TA. In an implementation, operations at 618 can include sending a blocking notification (not explicitly visible in FIG. 6), e.g., to the user who generated the RAST DST and uploaded the TA.

Figure 7:
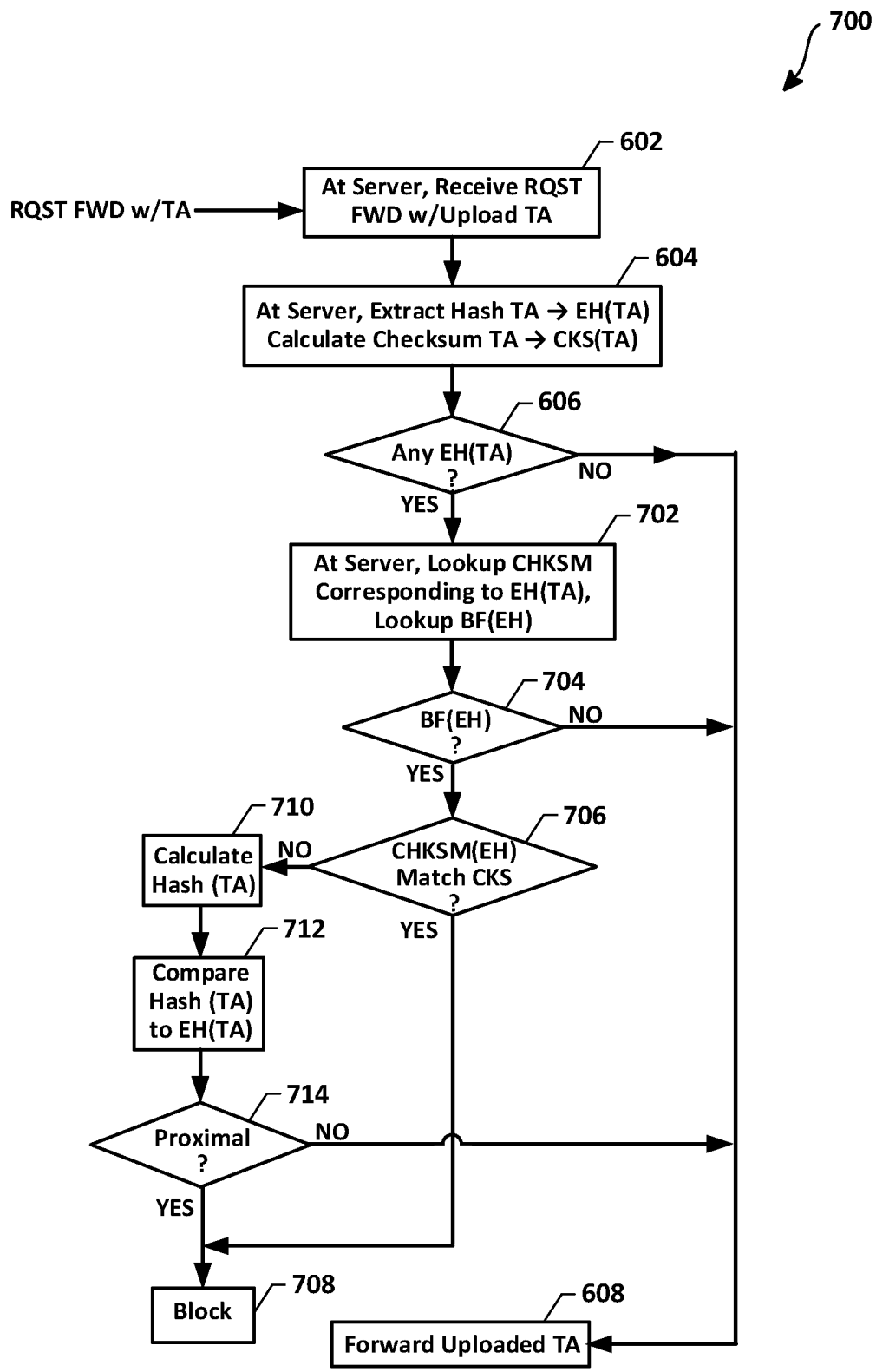
FIG. 7 shows a logic diagram of an example variation of the FIG. 5 flow, providing detection and blocking distribution of nuanced changes to blocked attachments, in accordance with various aspects of the present disclosure.

The flow of FIG. 6 automatically distributes an attachment when the attachment's checksum does not match the stored checksum for the extracted. FIG. 7 shows a logic diagram of a flow 700 that can be a modification of the flow 600, and features can include, but are not limited to, capability of detecting minor modification or nuanced tampering with an attachment content and can provide prevention of uploading and distribution of such modified attachments. The FIG. 7 flow 700 can include blocks from the FIG. 6 flow 600 and, for brevity, description of such blocks will not be repeated.

Referring to FIG. 7, upon operations at 604 extracting, or applying operations to extract HS(TA) and calculating CKS (TA), if the result indicates no hash the flow 700 can proceed to 608 and distribute the attachment, as shown by the "NO" outbranch from conditional flow block 606. If operations at 604 extract HS(TA), the flow 700 can proceed to 702, where operations can look up, e.g., in FIG. 1 table TBK, for an entry 120 corresponding to the extracted HS and, if any, read CHKSM from its field 126 and the BF value from its field 124. If operations at 702 find no BF for the extracted hash HS(TA) the flow 700 can proceed to 608 and distribute the attachment, as shown by the "NO" outbranch from conditional flow block 704. If operations at 702 find a BF for the extracted hash HS(TA) the flow 700 can proceed to 706, as shown by the "YES" outbranch from conditional flow block 704 and compare the retrieved CHKSM to the calculated CKS. If the comparison results match, the attachment TA is determined to be an exact copy of a blocked attachment, whereupon the flow 700 can proceed from the "YES" outbranch of block 706 to 708 and block the distribution.

If there is a mismatch between the retrieved CHKSM and the calculated CKS, the flow 700 can proceed through the "NO" outbranch of block 706 to 710 and apply hash operations to TA to calculate Hash(TA). The flow 700 can then proceed to 712 and apply operations to determine whether Hash(TA) is within a threshold distance of the extracted HS(TA). If the difference is less than the threshold, the flow can proceed to 708 and block the attachment, as shown by the "YES" outbranch from conditional flow block 714. If the difference between Hash(TA) and HS(TA) is greater than the threshold, the flow can proceed to 608 and distribute the attachment, as shown by the "NO" outbranch from conditional flow block 714.

Figure 8:
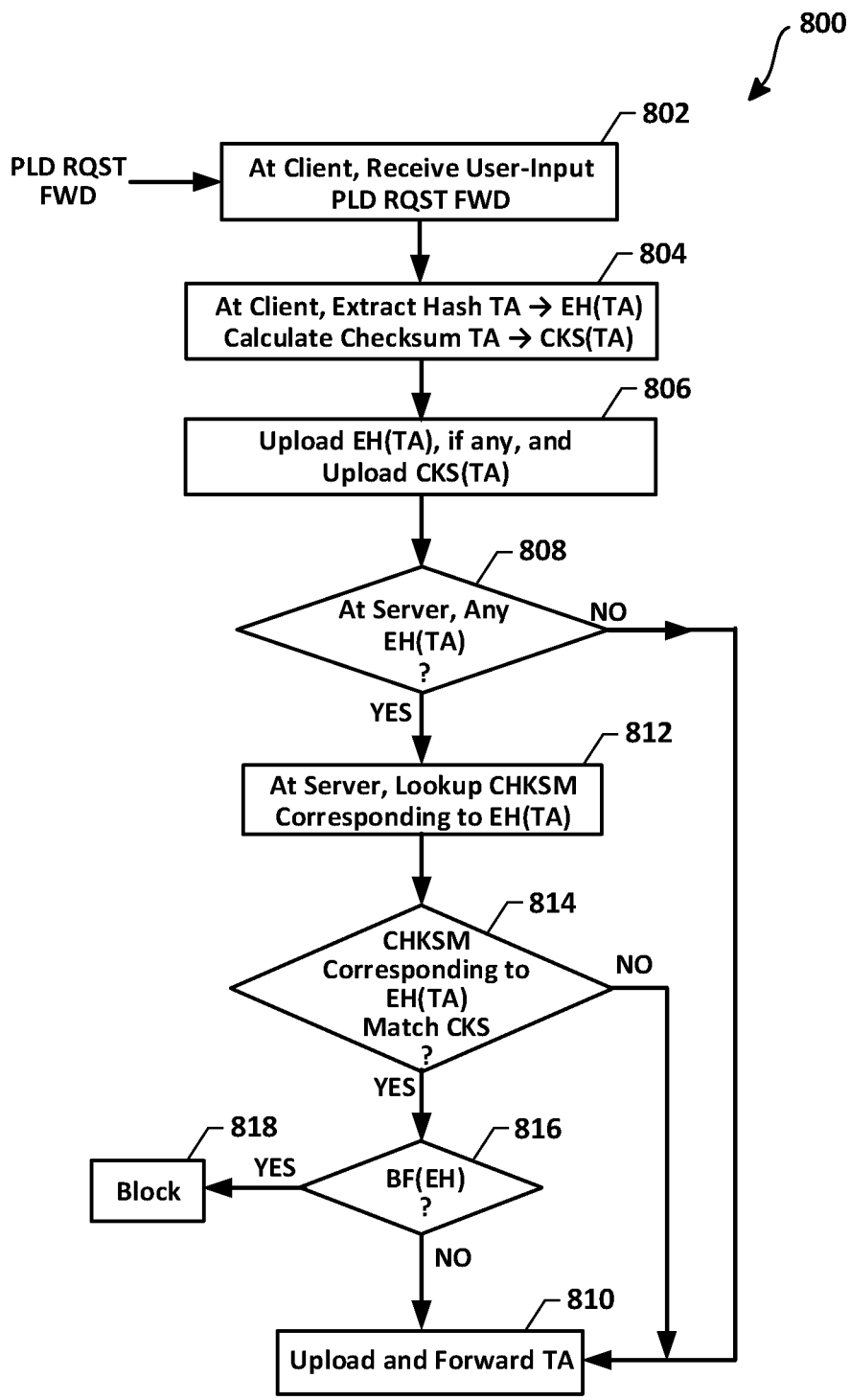
FIG. 8 shows a logic flow diagram of example operations in an implementation of a distributed server-client process that can provide bandwidth reducing pre-block of upload, in one or more processes for preventing distribution of non-acceptable attachments in accordance with various aspects of the present disclosure.

FIG. 8 shows a logic flow diagram 800 of example operations (hereinafter "flow 800") that can be provided in a distributed server-client selective upload process, in another example implementation of performing and blocking distribution of attachments in accordance with various aspects of the present disclosure. In overview, implementations applying operations according to the flow 800 can provide reduction in bandwidth overhead due to client users uploading attachments with requests to distribute same, followed by the messaging system server blocking the distribution due to a blocking flag. Technical features of implementations according to the flow 800 can include a pre-uploading qualification process in which the client can extract certain information from an attachment, the information being sufficient for server-side determination of whether the attachment is blocked from distribution, and communicating such information, e.g., as a packet or equivalent that can be far smaller than the attachment, and transmitting the packet or equivalent to the server. The server can then apply server-side operations, prior to uploading the attachment, that can determine whether the attachment is blocked from distribution.

In an example instance, operations according to the flow 800 can include receiving, 2.g., at FIG. 1 system 100 server resource 102, a client transmitted pre-upload request to distribute an attachment. Implementation of the flow 800 can include a software module (not separately visible in the figures), installed for example on client devices, such as the system 100 UEs 104.

Operations in the flow 800 can begin with reception at 802, e.g., by user input to a UE 103 GUI (not separately visible in the figures) of a pre-upload distribution request, such as the example labeled "PLD DST RAST." The flow 800 can then proceed to 804 and apply client-side operations to extract a hash, if any, from the uploaded TA and to calculate the checksum of TA. In the FIG. 8 example, the result of the hash extraction is visible as "HS(TA)," and the result of the checksum calculation is visible as "CKS(TA)." The flow can 800 can then proceed from 804 to 806, and upload HS(TA), if any, and the CKS(TA) to the server. Upon the uploaded result of the hash extraction at 804 indicating no hash, a flow routing at 808 can route the flow 800 to 810, where operations can upload TA and then distribute the uploaded TA in accordance with the PLD DST RAST.

Continuing with the flow 800, upon the upload 806 of the result of the hash extraction at 804 indicating hash, i.e., a valid HS(TA), the flow 800 can proceed to 812, as shown by the "YES" outroute from the conditional routing block 808. Operations applied at 812 can include server-side retrieval, for example, from the system 100 blocking flag/checksum memory 118, of a checksum corresponding to the extracted HS(TA). For example, in a scenario where TA is a copy of a hash/checksum embedded attachment HCEA(j) that was previously downloaded by operations at 516 of the FIG. 5 flow 500, operations at 812 can retrieve the CHKSM(j) value that was embedded at 508, and stored (e.g., in the blocking flag/checksum memory 118) in a manner retrievable by the embedded hash HT(j). Upon retrieving at 812 the checksum corresponding to the HS(TA) extracted at 804, the flow 800 can proceed to 814 and compare the retrieved CHKSM value to the CKS(TA) checksum calculated at 804. Based on the comparison at 814 indicating no match, the uploaded TA may be classified as an edited or otherwise modified form of a previously downloaded copy of a hash/checksum embedded attachment HCEA. The TA therefore may be not be subject to being blocked, even if the blocking flag/checksum memory 118 stores a blocking flag. Accordingly, the flow 800 can proceed as shown by the "NO" outbranch of conditional flow block 814, to 810, where operations can distribute the uploaded TA in accordance with the PLD RAST DST.

Referring to the above-described example, a positive result of the comparison at 814 can indicate that TA can be a copy of a stored attachment STC(i) in the database DB. To determine whether the stored attachments STC(I) is a blocked stored attachment BTC(i), the flow 800 can proceed to 816 (as shown by the "YES" outbranch of the conditional flow block 814) where operations can be applied to search, or otherwise check or inspect the blocking flag/checksum memory 118 to make such determination. Upon a negative result of operations at 816, the flow 800 can proceed to 810, as shown by the "NO" outbranch of conditional flow block 816, where operations can be applied to distribute the uploaded TA in accordance with the RAST DST. Upon a positive result of operations at 816, i.e., detection of an extant blocking flag corresponding to the extracted hash HS(TA), the flow 800 can proceed to 818 as shown by the "YES" outbranch of conditional flow block 816, where operations can be applied to prevent or block the distribution of the uploaded TA. In an implementation, operations at 818 can include sending a blocking notification (not explicitly visible in FIG. 8), e.g., to the UE of the user that generated the PLD RAST DST. As can be seen, the above-described flow uploads the TA only if the server determines it is not blocked.

In an implementation, systems can insert additional metadata that can link a present file to another file, such as a previous file that a client submitted to the server (e.g., system 100 server 102) for uploading and distribution. Systems and method can be implemented with features to instantiate and update records of such linked files being uploaded and distributed by a clients. Technical benefits can include obviating the need to create a new file identifier, e.g., another STC-ID(i) for subsequent ones of the linked files once a file identifiers has been created for the first one.

Figure 9:
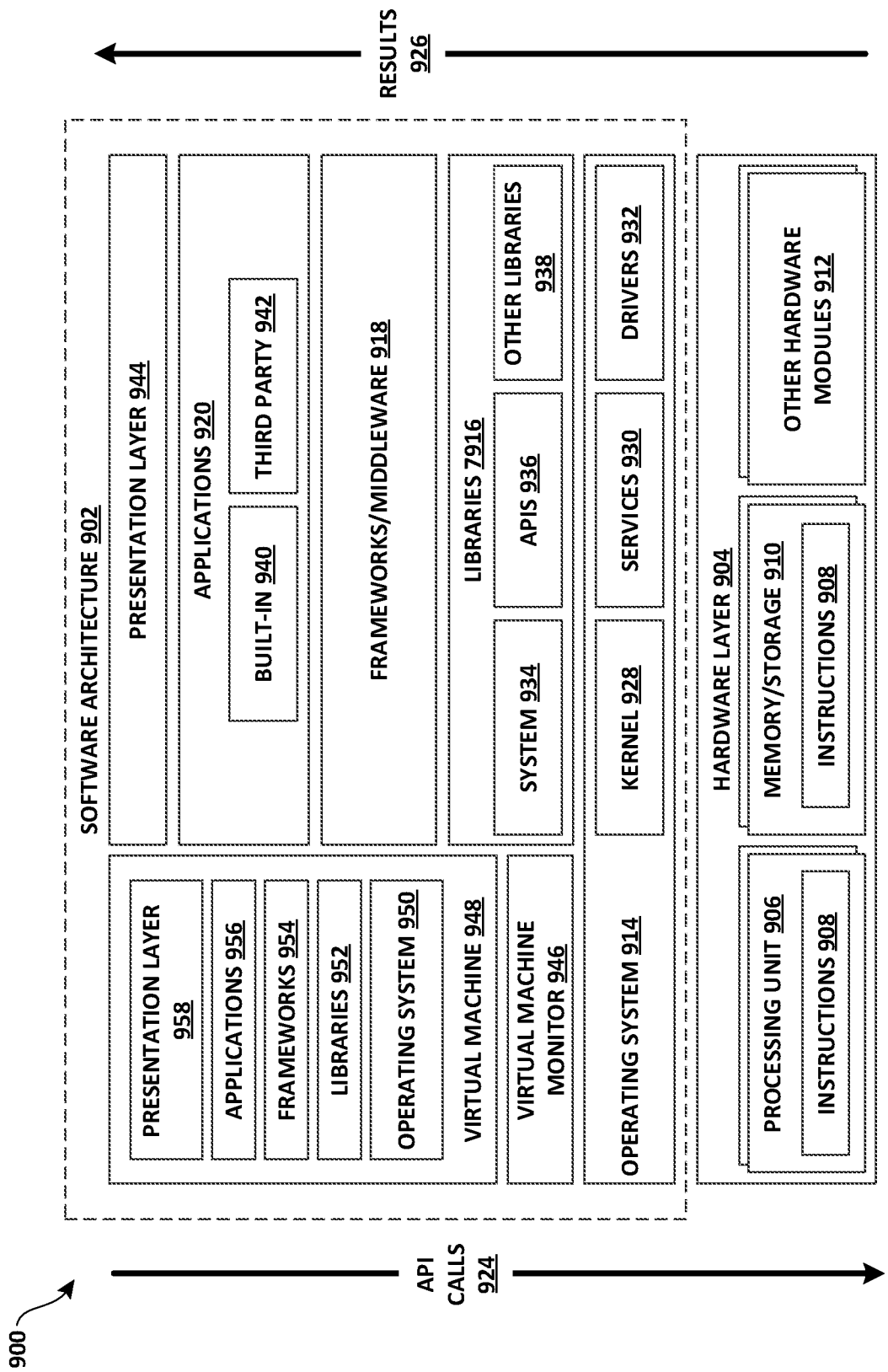
FIG. 9 shows a block diagram illustrating one example software architecture, various portions of which may be used in conjunction with various hardware architectures herein described.

FIG. 9 is a block diagram 900 illustrating an example software architecture 902, various portions of which may be used in conjunction with various hardware architectures herein described, which may implement any of the above-described features. FIG. 9 is a non-limiting example of a software architecture and it will be appreciated that many other architectures may be implemented to facilitate the functionality described herein. The software architecture 902 may execute on hardware such as client devices, native application provider, web servers, server clusters, external services, and other servers.

A representative hardware layer 904 includes a processing unit 906 and associated executable instructions 908. The executable instructions 908 represent executable instructions of the software architecture 902, including implementation of the methods, modules and so forth described herein. The hardware layer 904 includes a memory/storage 910 that can include the executable instructions 908 and accompanying data. The hardware layer 904 may also include other hardware modules 912. Instructions 908 held by processing unit 906 may be portions of instructions 908 held by the memory/storage 910.

The example software architecture 902 may be conceptualized as layers, each providing various functionality. For example, the software architecture 902 may include operating system (OS) 914, libraries 916, frameworks 918, applications 920, and a presentation layer 944. Operationally, the applications 920 and/or other components within the layers may invoke API calls 924 to other layers and receive corresponding results 926. The layers illustrated are representative, and other software architectures may include additional or different layers. For example, some mobile or special purpose operating systems may not provide the frameworks/middleware 918.

The OS 914 may manage hardware resources and provide common services. The OS 914 may include, for example, a kernel 928, services 930, and drivers 932. The kernel 928 may act as an abstraction layer between the hardware layer 904 and other software layers. For example, the kernel 928 may provide memory management, processor management (for example, scheduling), component management, networking, security settings, and so on. The services 930 may provide other common services for the other software layers. The drivers 932 may perform control or interface with the underlying hardware layer 904. For instance, the drivers 932 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 916 may provide a common infrastructure that may be used by the applications 920 and/or other components and/or layers. The libraries 916 can provide functionality for use by other software modules to perform tasks, rather than interacting directly with the OS 914. The libraries 916 may include system libraries 934 (for example, C standard library) that may provide functions such as memory allocation, string manipulation, and file operations. The libraries 916 may include API libraries 936 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 916 may include other libraries 938 to provide functions for applications 920 and other software modules.

The frameworks 918 (also sometimes referred to as middleware) can provide a higher-level common infrastructure that may be used by the applications 920 and/or other software modules. For example, the frameworks 918 may provide graphic user interface (GUI) functions, high-level resource management, or high-level location services. The frameworks 918 may provide a spectrum of other APIs for applications 920 and/or other software modules.

The applications 920 can include built-in applications 920 and/or third-party applications 922. Examples of built-in applications 920 may include, but are not limited to, a contacts application, a browser application, a location application, a media application, a messaging application, and/or a game application. Third-party applications 922 may include any applications developed by an entity other than the vendor of the particular system. The applications 920 may use functions available via OS 914, libraries 916, frameworks 918, and presentation layer 924 to create user interfaces to interact with users.

The software architecture 902 can include a virtual machine 928. The virtual machine 928 can provide, for example, an execution environment for applications/modules to execute as if executing on a hardware machine (such as the machine 900 of FIG. 9, for example). The virtual machine 928 may be hosted by a host OS (for example, OS 914) or hypervisor, and may have a virtual machine monitor 926 which can manage operation of the virtual machine 928 and interoperation with the host operating system. A software architecture, which may be different from software architecture 902 outside of the virtual machine, can execute within the virtual machine 928 such as an OS 950, libraries 952, frameworks 954, applications 956, and/or a presentation layer 958.

Figure 10:
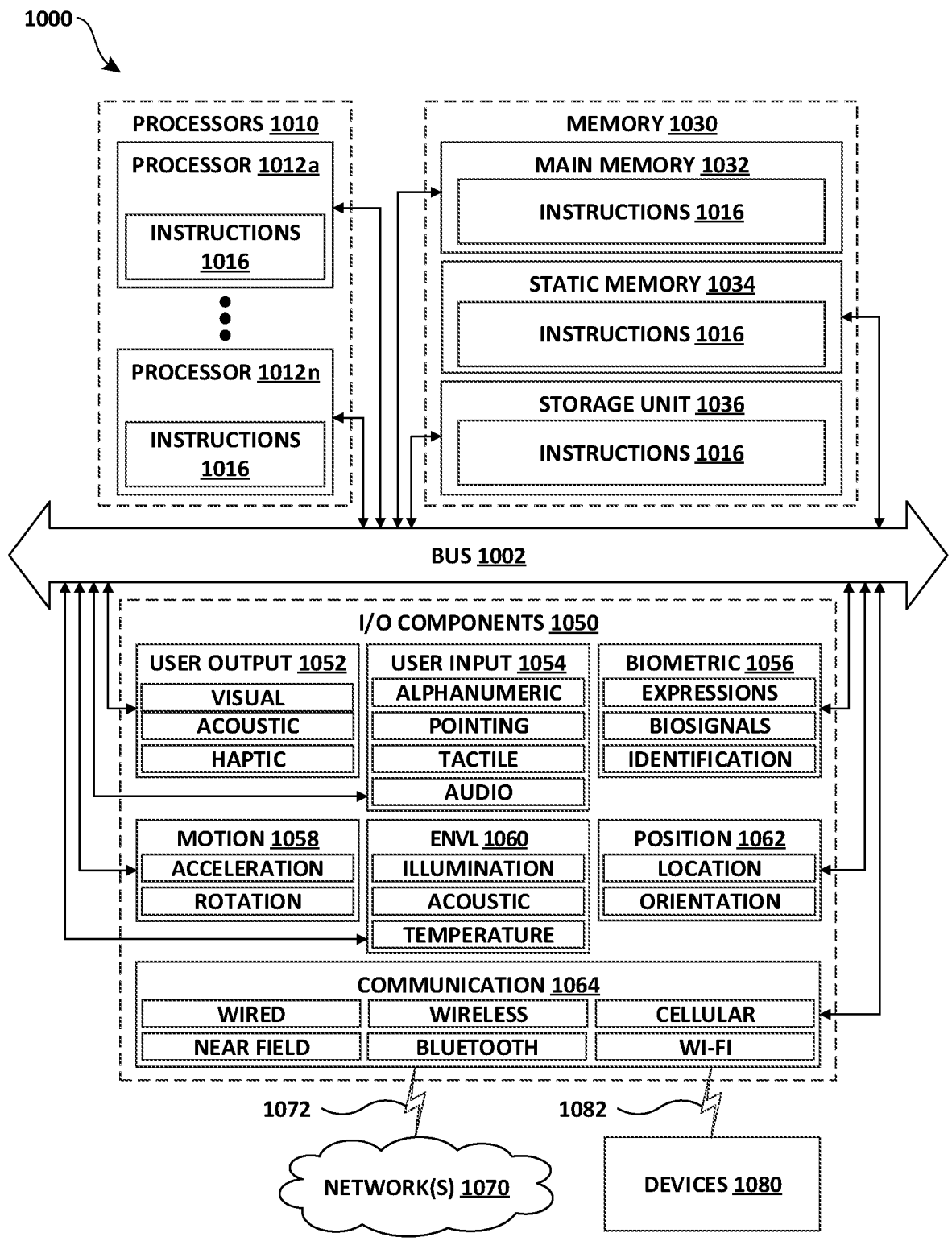
FIG. 10 shows a functional block diagram illustrating components of one example machine configured to read instructions from a machine-readable medium and perform any of the features described herein.

FIG. 10 is a block diagram illustrating components of an example machine 1000 configured to read instructions from a machine-readable medium (for example, a machine-readable storage medium) and perform any of the features described herein. The example machine 1000 is in a form of a computer system, within which instructions 1016 (for example, in the form of software components) for causing the machine 1000 to perform any of the features described herein may be executed. The instructions 1016 may therefore be used to implement methods or components described herein. The instructions 1016 cause unprogrammed and/or unconfigured machine 1000 to operate as a particular machine configured to carry out the described features. The machine 1000 may be configured to operate as a standalone device or may be coupled (for example, networked) to other machines. In a networked deployment, the machine 1000 may operate in the capacity of a server machine or a client machine in a server-client network environment, or as a node in a peer-to-peer or distributed network environment. Machine 1000 may be implemented as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 1000 is illustrated, the term "machine" includes a collection of machines that individually or jointly execute the instructions 1016.

The machine 1000 may include processors 1010, memory 1030, and I/O components 1050, which may be communicatively coupled via, for example, a bus 1002. The bus 1002 may include multiple buses coupling various elements of machine 1000 via various bus technologies and protocols. In an example, the processors 1010 (including, for example, a central processing unit (CPU), a graphics processing unit (GPU), a digital signal processor (DSP), an ASIC, or a suitable combination thereof) may include one or more processors 1012a to 1012n that may execute the instructions 1016 and process data. In some examples, one or more processors 1010 may execute instructions provided or identified by one or more other processors 1010. The term "processor," as used herein, can include but is not limited to a multi-core processor including cores that may execute instructions contemporaneously. Although FIG. 10 shows multiple processors, the machine 1000 may include a single processor with a single core, a single processor with multiple cores (for example, a multi-core processor), multiple processors each with a single core, multiple processors each with multiple cores, or any combination thereof. In some examples, the machine 1000 may include multiple processors distributed among multiple machines.

The memory/storage 1030 can include a main memory 1032, a static memory 1034, or other memory, and a storage unit 1036, both accessible to the processors 1010 such as via the bus 1002. The storage unit 1036 and memory 1032, 1034 store instructions 1016 embodying any one or more of the functions described herein. The memory/storage 1030 can also store temporary, intermediate, and/or long-term data for processors 1010. The instructions 1016 can also reside, completely or partially, within the memory 1032, 1034, within the storage unit 1036, within at least one of the processors 1010 (for example, within a command buffer or cache memory), within memory at least one of I/O components 1050, or any suitable combination thereof, during execution thereof. Accordingly, the memory 1032, 1034, the storage unit 1036, memory in processors 1010, and memory in I/O components 1050 are examples of machine-readable media.

As used herein, "machine-readable medium" refers to structure, system, apparatus, or device able to temporarily or permanently store instructions and data that cause machine 1000 to operate in a specific fashion. The term "machine-readable medium," as used herein, does not encompass transitory signals per se (such as on a carrier wave propagating through a medium); the term "machine-readable medium" may therefore be considered non-transitory, tangible, machine-readable medium. Non-limiting examples of a non-transitory, tangible machine-readable medium may include, but are not limited to, nonvolatile memory (such as flash memory or read-only memory (ROM)), volatile memory (such as a static random-access memory (RAM) or a dynamic RAM), buffer memory, cache memory, optical storage media, magnetic storage media and devices, network-accessible or cloud storage, other types of storage, and/or any suitable combination thereof. The term "machine-readable medium" applies to a single medium, or combination of multiple media, used to store instructions (for example, instructions 1016) for execution by a machine 1000 such that the instructions, when executed by one or more processors 1010 of the machine 1000, cause the machine 1000 to perform and one or more of the features described herein. Accordingly, a "machine-readable medium" may refer to a single storage device, as well as "cloud-based" storage systems or storage networks that include multiple storage apparatus or devices.

The I/O components 1050 may include a wide variety of hardware components adapted to receive input, provide output, produce output, transmit information, exchange information, capture measurements, and so on. The specific I/O components 1050 included in a particular machine will depend on the type and/or function of the machine. For example, mobile devices such as mobile phones may include a touch input device, whereas a headless server or IoT device may not include such a touch input device. The particular examples of I/O components illustrated in FIG. 10 are in no way limiting, and other types of components may be included in machine 1000. The grouping of I/O components 1050 are merely for simplifying this discussion, and the grouping is in no way limiting. In various examples, the I/O components 1050 may include user output components 1052 and user input components 1054. User output components 1052 may include, for example, display components for displaying information (for example, a liquid crystal display (LCD) or a projector), acoustic components (for example, speakers), haptic components (for example, a vibratory motor or force-feedback device), and/or other signal generators. User input components 1054 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 1050 may include biometric components 1056 and/or position components 1062, among a wide array of other environmental sensor components. The biometric components 1056 may include, for example, components to detect body expressions (for example, facial expressions, vocal expressions, hand or body gestures, or eye tracking), measure biosignals (for example, heart rate or brain waves), and identify a person (for example, via voice-, retina-, and/or facial-based identification). The position components 1062 may include, for example, location sensors (for example, a Global Position System (GPS) receiver), altitude sensors (for example, an air pressure sensor from which altitude may be derived), and/or orientation sensors (for example, magnetometers).

The I/O components 1050 may include communication components 1064, implementing a wide variety of technologies operable to couple the machine 1000 to network(s) 1070 and/or device(s) 1080 via respective communicative couplings 1072 and 1082. The communication components 1064 may include one or more network interface components or other suitable devices to interface with the network(s) 1070. The communication components 1064 may include, for example, components adapted to provide wired communication, wireless communication, cellular communication, Near Field Communication (NFC), Bluetooth communication, Wi-Fi, and/or communication via other modalities. The device(s) 1080 may include other machines or various peripheral devices (for example, coupled via USB).

In some examples, the communication components 1064 may detect identifiers or include components adapted to detect identifiers. For example, the communication components 1064 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 1062, such as, but not limited to, geo-location via Internet Protocol (IP) address, location via Wi-Fi, cellular, NFC, Bluetooth, or other wireless station identification and/or signal triangulation.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows, and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein.

Relational terms such as first and second and the like may be used solely to distinguish one entity or action from another without necessarily requiring or implying any such first, second relationship or order between such entities or actions. The terms "comprises," "comprising," and any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "a" or "an" does not, without further constraints, preclude the existence of additional identical elements in the process, method, article, or apparatus that comprises the element.

The Abstract of the Disclosure is provided to allow the reader to quickly identify the nature of the technical disclosure. It is provided with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that any claim requires more features than the claim expressly recites. Rather, as the following claims reflect, inventive subject matter lies in less than all features of a single disclosed example. Therefore, the following claims are hereby incorporated into the Detailed Description, with each claim standing on its own as a separately claimed subject matter.

What is claimed is:

1. A system for blocking distribution of an attachment file containing distribution-prohibited content, comprising:
   a processor; and
   a memory coupled to the processor, the memory storing executable instructions that when executed by the processor cause the processor to control the system to:
      store, in a data storage, a plurality of attachment files, each attachment file contained in one or more messages;
      associate each attachment file with unique attachment identification data (ID);
      analyze content of each attachment file to determine whether the analyzed content of each attachment file is of a distribution-prohibited content type;
      identify, based on determining whether the analyzed content of each attachment file is of the distribution-prohibited content type, a distribution-prohibited attachment group including one or more attachment files containing the content of the distribution-prohibited content type;
      indicate the attachment ID of each attachment file included in the identified distribution-prohibited attachment group as distribution-prohibited attachment ID;
      receive, from a user device, a request to distribute a first attachment file of the plurality of attachment files stored in the data storage, the request containing first attachment ID associated with the first attachment file;
      in response to receiving the request, determine whether the first attachment ID corresponds to the attachment ID indicated as the distribution-prohibited attachment ID; and
      in response to determining that the first attachment ID corresponds to the attachment ID indicated as the distribution-prohibited attachment ID, deny the request from the user device to distribute the first attachment file.

2. The system of claim 1, wherein:
   the attachment ID associated with each attachment file includes a hash,
   the distribution-prohibited attachment ID includes the hash of the corresponding attachment file, and
   to determine whether the first attachment ID corresponds to the attachment ID indicated as the distribution-prohibited attachment ID, the instructions, when executed by the processor, further cause the processor to control the system to compare the hash of the first attachment file to the hash of the one or more attachment files in the distribution-prohibited attachment group.

3. The system of claim 1, wherein the received request includes a request to distribute the first attachment as an attachment to an instant message.

4. The system of claim 3, wherein the instructions, when executed by the processor, further cause the processor to control the system to cause the user device to display an indication of the first attachment being blocked.

5. The system of claim 1, wherein, to analyze content of each attachment file, the instructions, when executed by the processor, further cause the processor to control the system to:
receive an identification of unacceptable content; and
determine a likelihood of the content of each attachment file containing the unacceptable content.

6. The system of claim 5, wherein, to determine a likelihood of the content of each attachment file containing the unacceptable content, the instructions, when executed by the processor, further cause the processor to control the system to scan the data storage asynchronously with receipt of the plurality of attachment files or asynchronously with the denying of the request, or both.

7. The system of claim 1, wherein the instructions, when executed by the processor, further cause the processor to control the system to revoke user access to the first attachment file.

8. The system of claim 1, wherein:
the plurality of attachment files stored in the data storage includes a second attachment file associated with a second attachment ID, and
the instructions, when executed by the processor, further cause the processor to control the system to:
determine, based on a match between the second attachment ID and at least a portion of the distribution-prohibited attachment ID of the first attachment file, a content difference between the content of the second attachment file and the content of the first attachment file; and
determine whether to distribute the second attachment file based on whether the content difference meets a content distribution blocking criterion.

9. A method of operating a system for blocking distribution of an attachment file containing distribution-prohibited content, the method comprising:
storing, in a data storage, a plurality of attachment files, each attachment file contained in one or more messages;
associating each attachment file with unique attachment identification data (ID);
analyzing content of each attachment file to determine whether the analyzed content of each attachment file is of a distribution-prohibited content type;
identifying, based on determining whether the analyzed content of each attachment file is of the distribution-prohibited content type, a distribution-prohibited attachment group including one or more attachment files containing the content of the distribution-prohibited content type;
indicating the attachment ID of each attachment file included in the identified distribution-prohibited attachment group as distribution-prohibited attachment ID;
receiving, from a user device, a request to distribute a first attachment file of the plurality of attachment files stored in the data storage, the request containing first attachment ID associated with the first attachment file;
in response to receiving the request, determining whether the first attachment ID corresponds to the attachment ID indicated as the distribution-prohibited attachment ID; and
in response to determining that the first attachment ID corresponds to the attachment ID indicated as the distribution-prohibited attachment ID, denying the request from the user device to distribute the first attachment file.

10. The method of claim 9, wherein:
the attachment ID associated with each attachment file includes a hash,
the distribution-prohibited attachment ID includes the hash of the corresponding attachment file, and
determining whether the first attachment ID corresponds to the attachment ID indicated as the distribution-prohibited attachment ID includes comparing the hash of the first attachment file to the hash of the one or more attachment files in the distribution-prohibited attachment group.

11. The method of claim 9, the received request includes a request to distribute the first attachment as an attachment to an instant message.

12. The method of claim 11, further comprising causing the user device to display an indication of the first attachment being blocked.

13. The method of claim 9, wherein analyzing content of each attachment file comprises:
receiving an identification of unacceptable content; and
determining a likelihood of the content of each attachment file containing the unacceptable content.

14. The method of claim 13, wherein determining a likelihood of the content of each attachment file containing the unacceptable content comprises scanning the data storage asynchronously with receipt of the plurality of attachment files or asynchronously with the denying of the request, or both.

15. The method of claim 9, further comprising revoking user access to the first attachment file.

16. The method of claim 9, wherein:
the plurality of attachment files stored in the data storage includes a second attachment file associated with a second attachment ID, and the method further comprises:
determining, based on a match between the second attachment ID and at least a portion of the distribution-prohibited attachment ID of the first attachment file, a content difference between the content of the second attachment file and the content of the first attachment file; and
determining whether to distribute the second attachment file based on whether the content difference meets a content distribution blocking criterion.

17. A non-transitory computer-readable medium comprising instructions that, when executed by a processor, cause the processor to control a system to perform functions for blocking distribution of an attachment file containing distribution- prohibited content, the functions comprising:
storing, in a data storage, a plurality of attachment files, each attachment file contained in one or more messages;
associating each attachment file with unique attachment identification data (ID);
analyzing content of each attachment file to determine whether the analyzed content of each attachment file is of a distribution-prohibited content type;
identifying, based on determining whether the analyzed content of each attachment file is of the distribution-prohibited content type, a distribution-prohibited attachment group including one or more attachment files containing the content of the distribution-prohibited content type;
indicating the attachment ID of each attachment file included in the identified distribution-prohibited attachment group as distribution-prohibited attachment ID;

receiving, from a user device, a request to distribute a first attachment file of the plurality of attachment files stored in the data storage, the request containing first attachment ID associated with the first attachment file;

in response to receiving the request, determining whether the first attachment ID corresponds to the attachment ID indicated as the distribution-prohibited attachment ID; and in response to determining that the first attachment ID corresponds to the attachment ID indicated as the distribution-prohibited attachment ID, denying the request from the user device to distribute the first attachment file.

18. The non-transitory computer-readable medium of claim 17, wherein:

the attachment ID associated with each attachment file includes a hash, the distribution-prohibited attachment ID includes the hash of the corresponding attachment file, and determining whether the first attachment ID corresponds to the attachment ID indicated as the distribution-prohibited attachment ID includes comparing the hash of the first attachment file to the hash of the one or more attachment files in the distribution-prohibited attachment group.

19. The non-transitory computer-readable medium of claim 17, for analyzing content of each attachment file, the instructions that, when executed by a processor, further cause the processor to control a system to perform functions of:

receiving an identification of unacceptable content; and determining a likelihood of the content of each attachment file containing the unacceptable content.

20. The non-transitory computer-readable medium of claim 17, wherein:

the plurality of attachment files stored in the data storage includes a second attachment file associated with a second attachment ID, and the instructions that, when executed by a processor, further cause the processor to control a system to perform functions of:

determining, based on a match between the second attachment ID and at least a portion of the distribution-prohibited attachment ID of the first attachment file, a content difference between the content of the second attachment file and the content of the first attachment file; and determining whether to distribute the second attachment file based on whether the content difference meets a content distribution blocking criterion.

* * * * *